United States Patent
Neary (10) Patent No.: US 6,914,962 B2
(45) Date of Patent: Jul. 5, 2005

(54) CALL-FLOW VERIFICATION METHOD AND APPARATUS

(75) Inventor: Thomas S. Neary, Northport, NY (US)

(73) Assignee: Nortel Networks Limited, St. Laurent (CA)

( * ) Notice: Subject to any disclaimer, the term of this patent is extended or adjusted under 35 U.S.C. 154(b) by 496 days.

(21) Appl. No.: 09/736,914

(22) Filed: Dec. 14, 2000

(65) Prior Publication Data

US 2002/0076008 A1 Jun. 20, 2002

(51) Int. Cl.[7] .............................................. H04M 1/24
(52) U.S. Cl. ............................. 379/10.02; 379/10.03; 379/27.02; 379/28.04; 455/423; 702/119
(58) Field of Search .......................... 379/10.03, 88.01, 379/10.02, 22.02, 27.02, 67.1, 88.04; 370/352; 704/270; 705/43; 455/423, 572; 702/119

(56) References Cited

U.S. PATENT DOCUMENTS

| | | | |
|---|---|---|---|
| 4,602,129 A | * | 7/1986 | Matthews et al. ........ 379/88.26 |
| 4,625,081 A | * | 11/1986 | Lotito et al. ............. 379/88.26 |
| 5,164,981 A | * | 11/1992 | Mitchell et al. ......... 379/88.01 |
| 5,461,664 A | * | 10/1995 | Cappadona ................. 455/572 |
| 5,594,791 A | * | 1/1997 | Szlam et al. ........... 379/265.09 |
| 5,822,397 A | * | 10/1998 | Newman ................. 379/27.02 |
| 5,933,776 A | * | 8/1999 | Kirkpatrick ................. 455/423 |
| 5,940,472 A | * | 8/1999 | Newman et al. ......... 379/10.02 |
| 5,966,428 A | * | 10/1999 | Ortiz Perez et al. ..... 379/27.02 |
| 6,169,787 B1 | * | 1/2001 | Shimada et al. ......... 379/91.01 |
| 6,304,634 B1 | * | 10/2001 | Hollier et al. ........... 379/22.02 |
| 6,321,198 B1 | * | 11/2001 | Hank et al. ................. 704/270 |
| 6,335,927 B1 | * | 1/2002 | Elliott et al. ................ 370/352 |
| 6,405,149 B1 | * | 6/2002 | Tsai et al. ................... 702/119 |
| 6,516,051 B2 | * | 2/2003 | Sanders .................... 379/10.03 |

* cited by examiner

Primary Examiner—Fan Tsang
Assistant Examiner—S Elahee
(74) Attorney, Agent, or Firm—Kenneth P. Robinson (57) ABSTRACT

After implementation of an interactive voice response (IVR) system providing voice prompts (i.e., utterances) to aid a telephone caller, it is desirable to provide call-flow verification to validate system accuracy, particularly under high-volume or saturation calling conditions. An IVR system has a call-flow verification (CFV) mode which can be activated for this purpose. In the CFV mode, the IVR system provides prompt signals which include coded signals representing the content of utterances. An automated call generator (ACG) unit places simulated user calls to the IVR system. The content of utterances is represented by coded signals included in prompt signals sent by the IVR system during the course of the simulated call and stored by the ACG unit. Verification can be applied for all possible paths an application might take (to check all possible go-right and error paths). By comparing content of received utterances represented by such coded signals with previously stored data representative of correct utterances, discrepancies are identified for call-flow verification. DTMF signals can be used to represent characters of an utterance in a coded format.

24 Claims, 7 Drawing Sheets

"DTMF 1" "DTMF 1" "DTMF 1"
"DTMF 1" "DTMF 1" "DTMF 0"
"DTMF 1" "DTMF 0" "DTMF 1"
"one"
"DTMF 1" "DTMF 1" "DTMF 1"
"DTMF 1" "DTMF 1" "DTMF 0"
"DTMF 1" "DTMF 0" "DTMF 1"

FIG. 4

"DTMF 0" "DTMF 8" "DTMF 0"
"DTMF 1" "DTMF 1" "DTMF 4"
"DTMF 1" "DTMF 0" "DTMF 1"
"DTMF 1" "DTMF 1" "DTMF 5"
"DTMF 1" "DTMF 1" "DTMF 5"
"Press one for date"
"DTMF 0" "DTMF 3" "DTMF 2"
"DTMF 1" "DTMF 0" "DTMF 0"
"DTMF 0" "DTMF 9" "DTMF 7"
"DTMF 1" "DTMF 1" "DTMF 6"
"DTMF 1" "DTMF 0" "DTMF 1"

FIG. 5

"DTMF 0" "DTMF 8" "DTMF 0"
"DTMF 1" "DTMF 1" "DTMF 4"
"DTMF 1" "DTMF 0" "DTMF 1"
"DTMF 1" "DTMF 1" "DTMF 5"
"DTMF 1" "DTMF 1" "DTMF 5"
"DTMF 0" "DTMF 3" "DTMF 2"
"DTMF 1" "DTMF 1" "DTMF 1"
"DTMF 1" "DTMF 1" "DTMF 0"
"DTMF 1" "DTMF 0" "DTMF 1"
"DTMF 0" "DTMF 3" "DTMF 2"
"DTMF 1" "DTMF 1" "DTMF 1"
"DTMF 1" "DTMF 1" "DTMF 4"
"DTMF 0" "DTMF 3" "DTMF 2"
"DTMF 1" "DTMF 0" "DTMF 0"
"DTMF 0" "DTMF 9" "DTMF 7"
"DTMF 1" "DTMF 1" "DTMF 6"
"DTMF 1" "DTMF 0" "DTMF 1"

FIG. 6

<DIGIT 1, ID><DIGIT 2, ID><DIGIT 3, FRAMING><DIGIT 4, EXTENT>

CALL-FLOW VERIFICATION METHOD AND APPARATUS

FIELD OF THE INVENTION

This invention relates to testing of interactive audio systems and, more particularly, to verification of content and flow of messages or prompts provided by a voice response system in the course of processing a user call.

BACKGROUND OF THE INVENTION

Banks, brokerages and other businesses now enable a customer to obtain account information by calling an automated telephone system. These systems, which will be referred to by the general term interactive voice response system or IVR system, generate computer-provided pre-recorded, synthesized or re-constituted "voice" messages to guide a caller in entering identification and inquiry data via telephone keypad activation, by voice input, or both. For example, after initiating a call the caller may hear an audio message (which may for present purposes be referred to as an utterance) requesting entry of the caller's account number, followed by a further series of utterances appropriate to process the caller's inquiry.

A problem separate and apart from the technical implementation of such systems is the need to provide verification of accuracy of operation on an initial and continuing basis, particularly after program modification. Verifying the content and flow of utterances provided during the course of a single call to an IVR system is relatively straight forward when performed manually. Accurate processing of a larger number of calls proceeding simultaneously or in close-time contiguity in an IVR system is correspondingly complex. Capabilities are needed to enable operators of IVR systems to verify accuracy of performance.

SUMMARY OF THE INVENTION

The present invention enables automated verification of utterance content and call flow performance by an interactive audio system. In a call connection to such a system for call-flow verification purposes, appropriate data inputs are provided to simulate a typical customer inquiry and data entry. To enable verification processing, the interactive audio system incorporates the capability of providing coded signals representative of content of each utterance in coded format for inclusion in prompt signals. By comparing the content of utterance labels, as represented by such coded signals transmitted in the course of a call connection, to pre-stored data representing the content of correct utterance labels for the interactive audio system under test, discrepancies can be identified and reported. Such discrepancies may represent, for example, utterance content errors or omissions, call flow errors or omissions, or combinations thereof.

For purposes of call-flow verification testing, the interactive audio system will, for example, be operable in a unique call-flow verification mode (termed a CFV mode) and such CFV mode may be selectable by inclusion of a CFV sequence code in a call connection to the interactive audio system. Pursuant to the invention, a CFV sequence code may typically include coded instructions to activate the CFV mode, to include or exclude actual utterances with the coded representations thereof, and to define the extent to which utterance label content is to be represented in coded signal format (e.g., initial and end portions, or all characters of an utterance label). By enabling automated call-flow verification for a single call connection, the invention enables automated verification of larger numbers of calls since each call is independently processed and results may be stored for analysis. Automated verification may be carried out on a call by call basis, without interfering with actual customer calls which can be intermixed.

For a better understanding of the invention, together with other and further objects, reference is made to the accompanying drawings and the scope of the invention will be pointed out in the accompanying claims.

DETAILED DESCRIPTION

Figure 1:
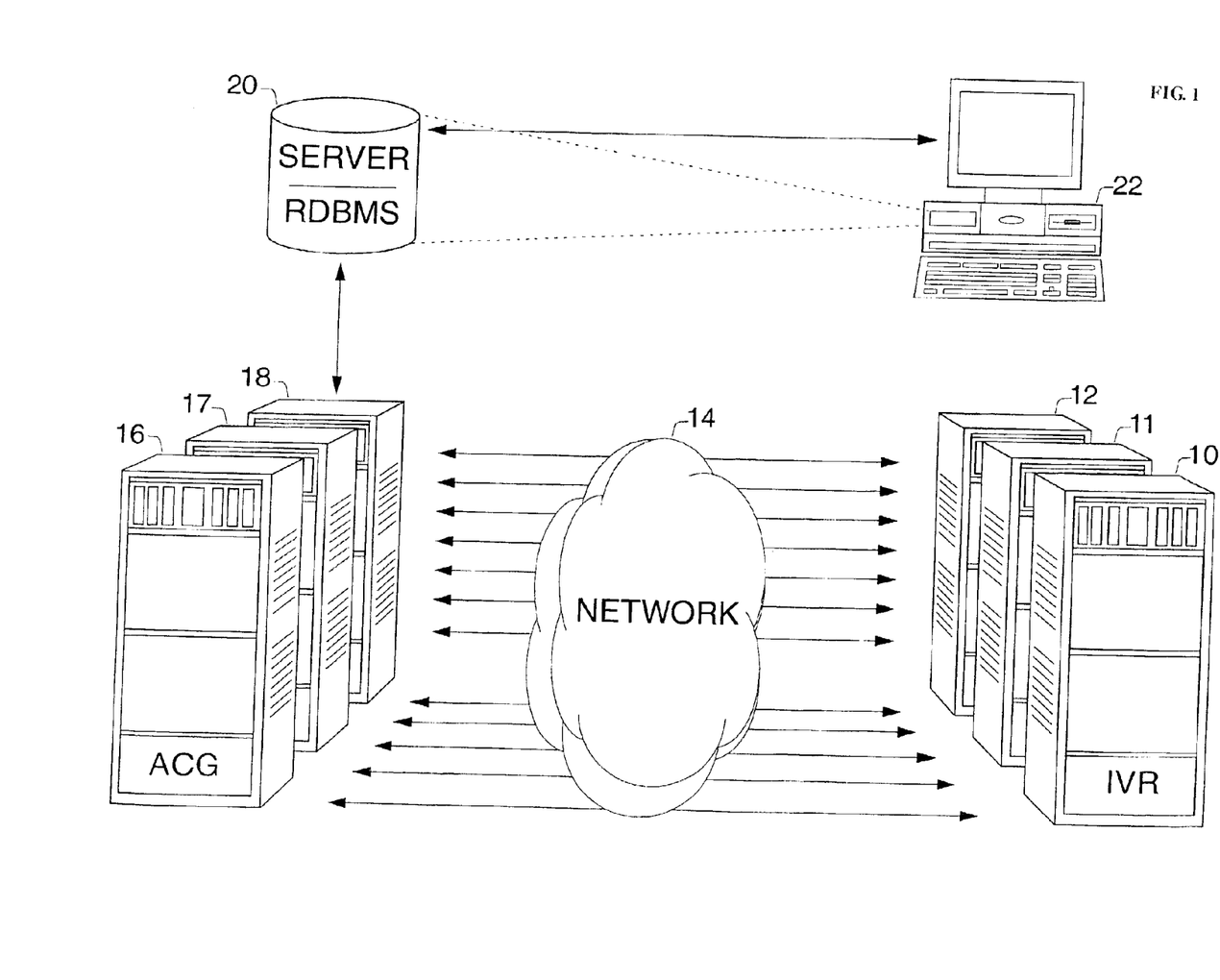
FIG. 1 shows a call-flow verification system.

FIG. 1 illustrates an equipment configuration suitable for use of a call-flow verification method. In this example, the three IVR systems 10, 11, 12 are used to provide a high-volume call handling capacity for a brokerage or other business application. Each of systems 10, 11, 12 may be provided by Periphonics VPS systems as commercially available from Nortel Networks of Bohemia, N.Y. As shown, IVR systems 10, 11, 12 are arranged to receive incoming calls via network 14, which may be a public or private telephone network, Internet or direct connect facility, or combination of these or other suitable communicative coupling facilities. For example, an IVR system can be deployed in a customer care center infrastructure, such as an Automatic Call Distribution ("ACD") center. Further detail is provided in U.S. Pat. No. 5,987,115, issued Nov. 16, 1999, to Petrunka et al., which is incorporated herein by reference. Customer care center infrastructures are also available as a Symposium™ Call Center product from Nortel Networks, Inc., of Ontario, Canada.

FIG. 1 includes automated call generator (ACG) units 16, 17, 18 arranged to place calls to IVR systems 10, 11, 12 via network 14. As will be further described, ACG units 16, 17, 18 may be provided by Periphonics VPS systems programmed to automatically place calls which simulate customer calls, including voice and dual-tone multi-frequency (DTMF) signals representing customer speech and telephone keypad actuations. By inclusion of three ACG units 16, 17, 18, a large volume of independent calls can be placed simultaneously or in short time periods to simulate peak volume customer activity.

The FIG. 1 equipment also includes a server facility 20 and a control console 22. Server 20 includes suitable software and storage capabilities to provide a database management system with processing, storage and access of and to call scripts, IVR responses and other data and information as will be further described. Call scripts that exercise all call flow paths (e.g., all go-right and error paths in an IVR application), including simulated user voice and keypad inputs, can thus be stored for use and repetitive re-use by the ACG units. Generally, a script is understood to be a type of computer code that can be directly executed by a program that understands the language in which the script is written. Scripts do not require compilation into object code to be executed. Console 22 may be a computer work station executing software suitable for control and management of the equipment and its operation, as will be further described. Server 20 may be a Periphonics Relational Database Management System (RDBMS), and console 22 may be a VPS Console, both as commercially-available from Nortel Networks.

For purposes of ease of understanding, attention will be directed to a single call (simulating a series of interchanges during the course of one customer call) placed to IVR system 10 by ACG unit 16 over a network 14. Note however, that a large number of such calls of identical or different content may be placed sequentially or in overlapping time periods.

Figure 2:
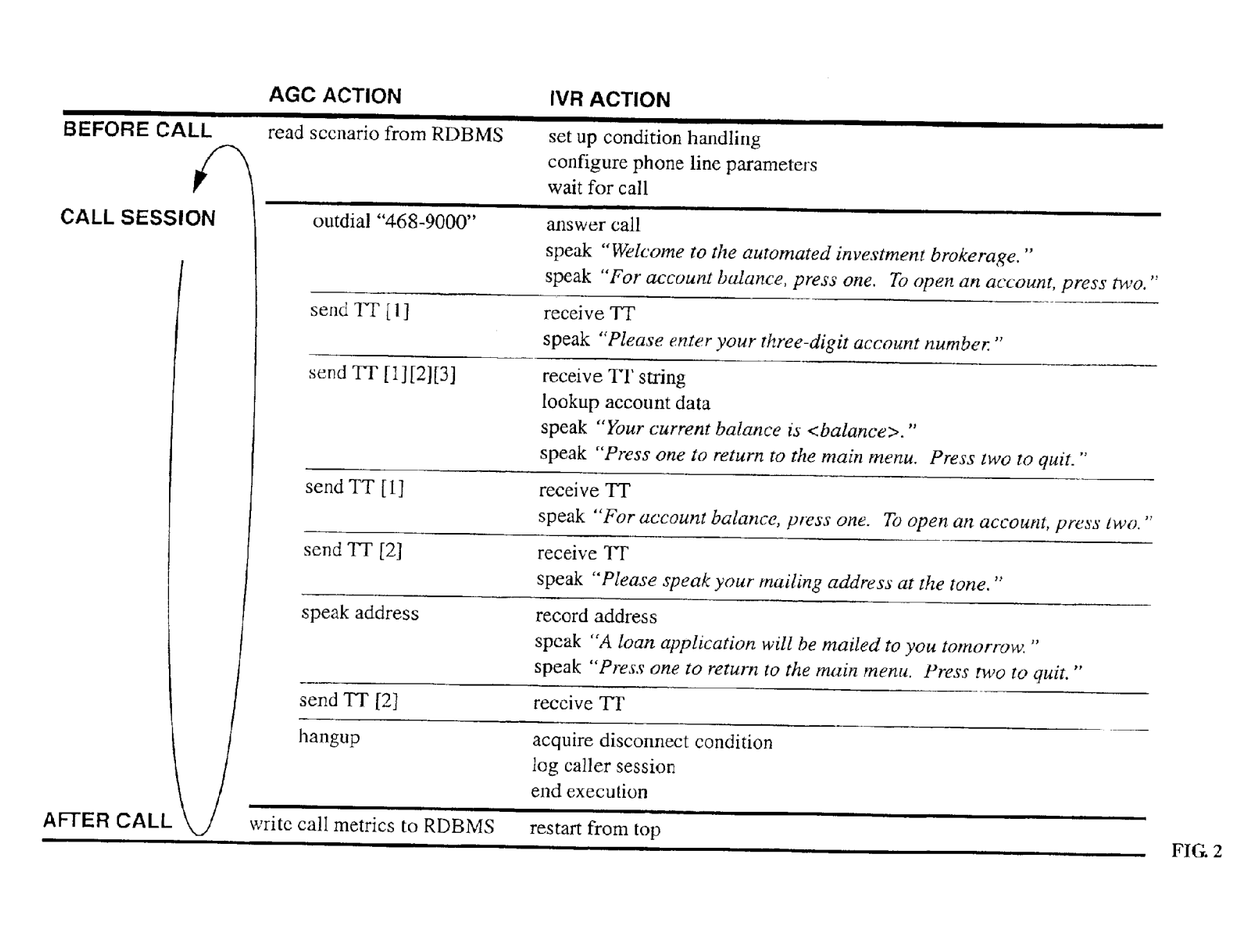
FIG. 2 illustrates data entry and responsive utterances during a simulated user call session.

As a basic overview, an example of a call operation is as follows. IVR system 10 is programmed to respond to an in-bound call by greeting the originating caller and then, via the same in-bound call connection, transmitting an utterance from the destination, such as "For account balance, press one. To open an account, press two." Upon the originating caller responding by activating the "one" key of the terminal keypad, a correct utterance by IVR system 10 might be "Please enter your three-digit account number." The originating caller would then respond by activating three keys of his terminal keypad. These and successive user inputs and IVR system utterances are illustrated in FIG. 2, which represents the basic telephony interchanges of a demonstration session for call-flow verification (not including coded utterance content, which will be further described below).

As simulated calls are placed and progress, at least three categories of data storage are involved for purposes of call-flow verification. First, the IVR system 10 is pre-programmed by storage (e.g., directly or via speech reconstruction or synthesis techniques) of specific utterances which are intended to be appropriate in processing and responding to a user call and user responses received in the course of that call. Examples of such utterances are provided in the "IVR ACTION" column of FIG. 2. Second, the ACG unit 16 is pre-programmed for call-flow verification of this particular IVR system 10 by storage of data representative of content of the same specific utterances which IVR system 10 is intended to provide. For this purpose, the actual utterances or data representative of the content of such utterances may be stored to be available for access by ACG unit 16, for example. Third, provision is made for receiving and storing the actual utterances, or data representative of the content of such utterances, as actually issued by IVR system 10 in the course of responding to a simulated user call. As will be described further, the second and third categories of data storage enable comparison of content of actual utterances with content of correct utterances, to enable identification of discrepancies and thereby verification of call-flow performance by IVR system 10.

Figure 3:
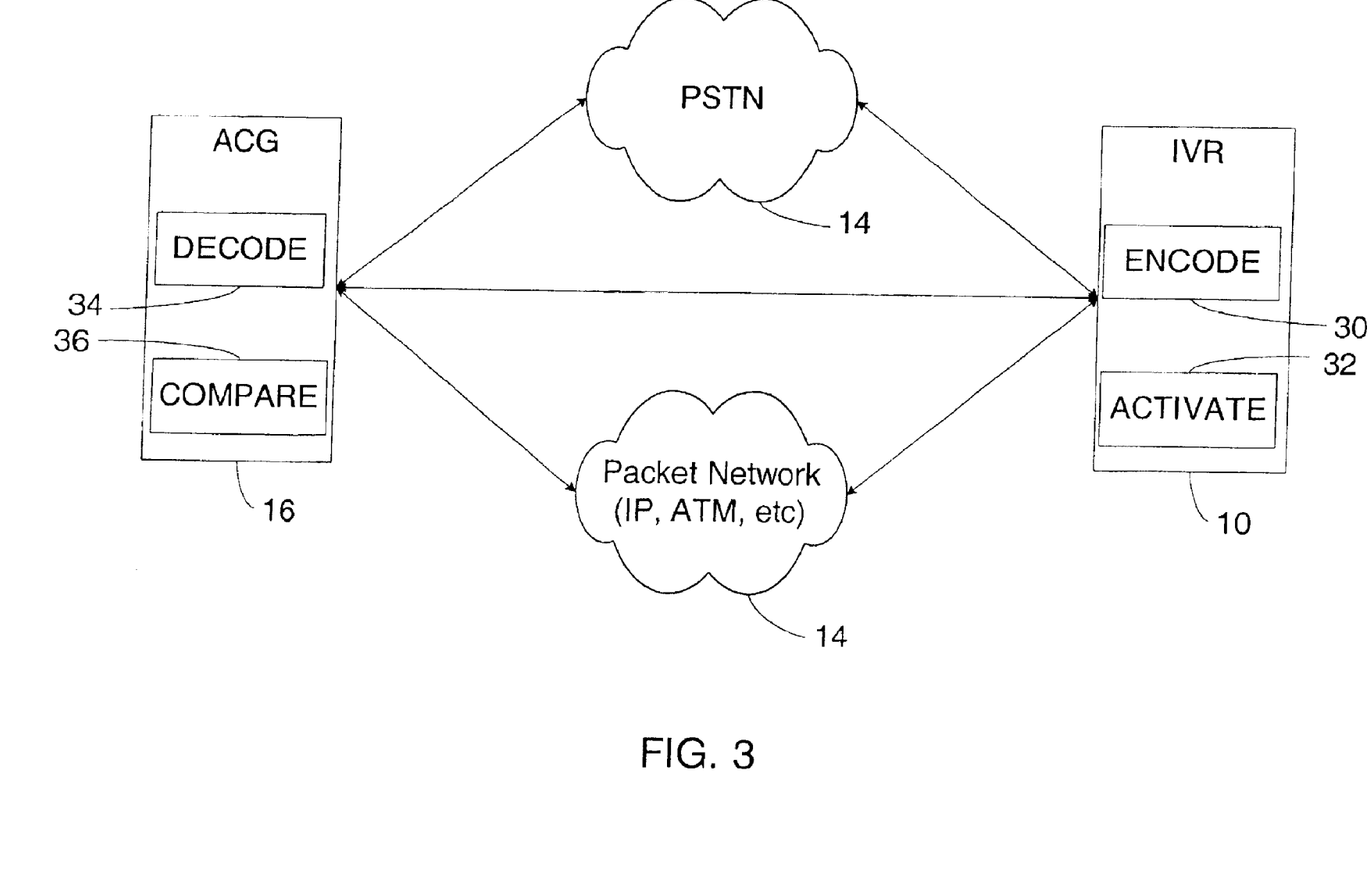
FIG. 3 shows an interactive audio system having a call-flow verification system and set-up for call-flow verification.

To enable call-flow verification, IVR unit 10 has call-flow verification (CFV) apparatus including circuits 30 and 32 shown in FIG. 3. Circuit 30 is an encoding circuit utilized to provide coded signals representative of content of utterances in coded format for inclusion in prompt signals sent by IVR system 10. Circuit 32 is an activation circuit to control activation and deactivation of encoding circuit 30. Activation circuit 32 also controls whether, during call-flow verification, prompt signals sent by IVR system 10 include or exclude the actual utterances whose content is represented by the coded signals, as well as how many characters of an utterance label are represented by the coded signals.

Capabilities of ACG unit 16 used for call-flow verification processing include circuits 34 and 36 shown in FIG. 3. Circuit 34 is a decoding circuit utilized to decode the coded signals representative of content of utterances. As will be further described, circuit 34 is effective to recover characters of utterance labels in ASCII format, from received signals encoded in DTMF format, for example. Circuit 36, as shown, is a comparison circuit to compare characters of received utterance labels with previously stored characters of correct utterance labels, as will be further described. Implementation of circuits 30, 32, 34 and 36 in appropriate form can be carried out by skilled persons using established techniques.

Reference is made herein to storage of data representative of the content of utterances and to coded signals representative of such content. The data may be stored in any appropriate format. As to such coded signals, in a currently preferred embodiment coded signals representative of utterance content are provided in the form of utterance labels encoded in DTMF format. Thus, internally to IVR system 10, each utterance (e.g., a voice or audio message) is identified for retrieval and other purposes by an utterance label (e.g., in ASCII format, as distinct from the actual audio for an utterance). Each such label may be an assigned word, phrase or alphanumeric series, may be a portion or all of the utterance expressed in ASCII format, or may be other suitable form of label. For purposes of transmissions between units 10 and 16, for example, an utterance may be represented by coded signals in DTMF, multi-frame (MF) or other suitable format, as will be further described. For exemplary purposes in the present description, it will be assumed that each utterance label is a representation of all characters of an utterance, expressed in ASCII format.

In a presently preferred embodiment, some or all of the alphanumeric characters of an utterance label are represented by coded signals in the form of DTMF signals. The CFV device in IVR system 10 is arranged so that during call-flow verification the format of prompt signals sent by IVR system 10 is determined by encoding circuit 30, under the control of activation circuit 32. That is to say, the format as to the inclusion of coded signals and inclusion or exclusion of the utterances whose content is represented by such coded signals, is determined by encoding circuit 30, in effect, overriding the customary operation of IVR system 10 as provided in the absence of call-flow verification activation. Also, it is arranged so that activation circuit 32 is responsive to a CFV sequence code sent to IVR system 10, for example by DTMF signals representing the CFV sequence which are received via an incoming call, direct connection, etc., to activate CFV for a series of calls or on a per call basis.

Operation of encoding circuit 30 will be further considered. As noted, coded signals can be provided in the form of DTMF signals representing alphanumeric characters of an utterance label in ASCII format.

At least three basic parameters are involved in operation of encoding circuit 30: an on/off parameter, a framing parameter and an extent parameter.

First, with the on/off parameter circuit 30 can be either activated, for call-flow verification, or deactivated, permitting operation of IVR system 10 for processing of customer calls during the ordinary course of business. It will be appreciated that if encoding circuit 30 were activated during processing of customer calls, DTMF signals included for call-flow verification purposes would be audible to the customer in this embodiment. In other embodiments coded signals in subliminal or other format which are inaudible or not noticeable by a caller may be employed.

Second, the framing parameter, with inclusion of coded signals (representing content of a specific utterance) in prompt signals to be sent by IVR system 10, the actual utterance itself may be included or excluded. Since the coded signals alone may be used for present call-flow verification purposes, it is typically not necessary to include the utterance itself. However, the audio utterance (e.g., in the form of audible speech) may be included so that after reception and storage it will be available for analysis as to clarity, sound level, etc.

Third, the extent parameter, in representing the content of an utterance the coded signals can, for example, represent the first few characters and the last few characters of an utterance label or, alternatively, each character of the entire utterance label.

Figure 4:
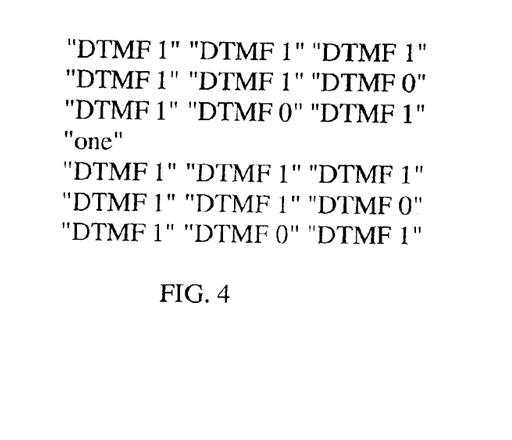
FIGS. 4, 5 and 6 illustrate examples of prompt signals including content of utterance labels encoded in DTMF format.
Figure 5:
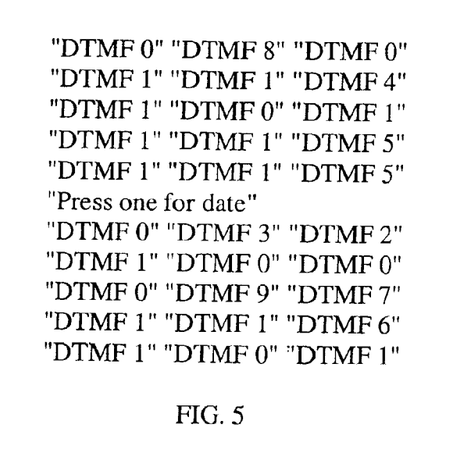
Figure 6:
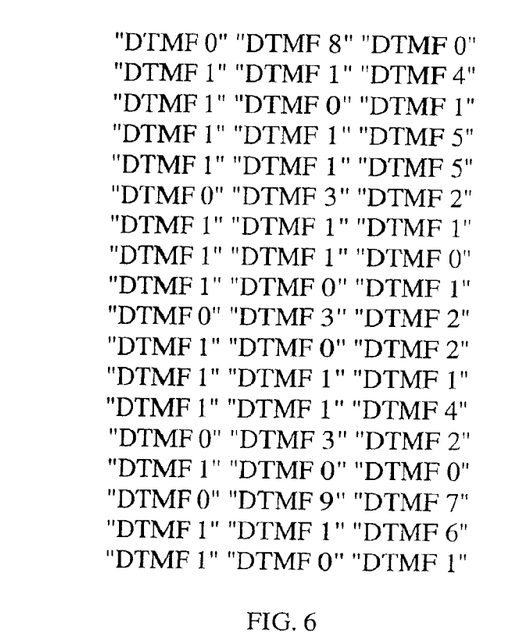

These parameters, as referred to above in respect to operation of encoding circuit 30, will be further illustrated by consideration of the examples provided in FIGS. 4, 5 and 6. The first, or on/off activation parameter is set for "on" (i.e., activation of call-flow verification) in these examples.

FIG. 4 illustrates prompt signals including coded signals (DTMF signals) for the one-word utterance "one". In this example, the second parameter, or the "framing" parameter, is set for inclusion of the actual utterance. The third parameter, or the "extent" parameter, is set for five characters. In this example, as illustrated in FIG. 4, for call-flow verification the prompt signals transmitted by IVR system 10 consist of the actual utterance "one" preceded by DTMF signals representing the letters "o", "n", "e" in ASCII format (i.e., representing the decimal equivalents thereof) and followed by the same DTMF signal content again representing each letter of the utterance label "one". In the present coding protocol, setting the extent parameter to "5" provides for encoding of the first five characters of an utterance label in a leading series of DTMF signals and the last five characters in a trailing series of DTMF signals. Here, since the utterance label includes only three characters, all three characters are represented in both the leading and trailing coding.

FIG. 5 illustrates prompt signals provided for call-flow verification regarding the utterance "Press one for date". Again, the framing parameter is set for inclusion of the actual utterance and the extent parameter is set for five characters. As shown, the leading series of DTMF signals represents the five letters of "press" and the trailing DTMF signals represent the five characters "space", "d", "a", "t", "e". For this purpose, the space between words is treated as a character and represented by appropriate ASCII coding.

FIG. 6 also addresses the utterance "Press one for date". However, in this example the second or framing parameter is set for exclusion of the actual utterance and the third or extent parameter is set for "all" characters. Thus, the actual utterance is not included in the prompt signals, but the eighteen characters (including spaces) of the utterance label are represented by a series of DTMF signals representing the characters in ASCII format.

Figure 7A:
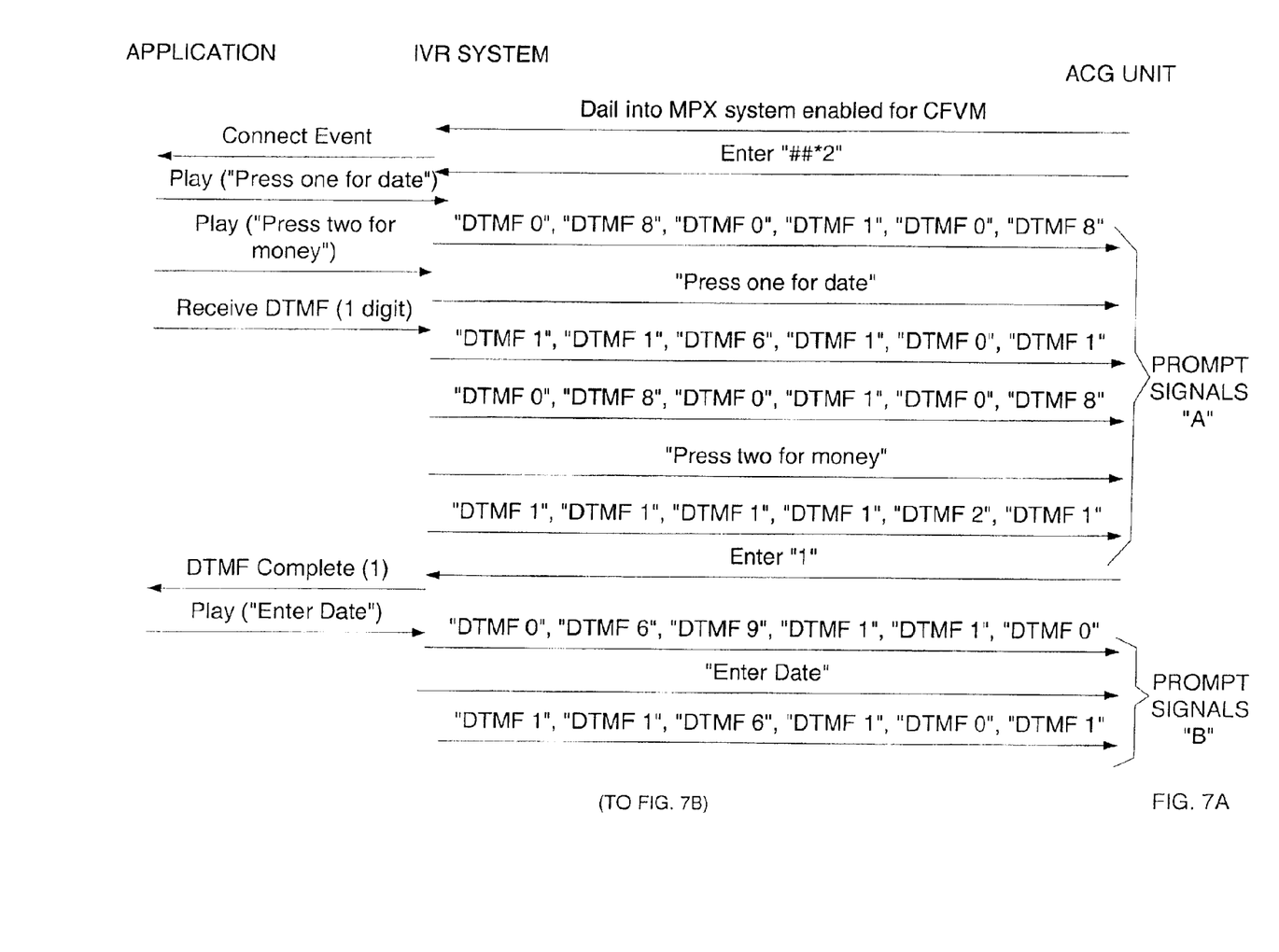
FIG. 7 illustrates encoding of utterance labels in prompt signals in the course of a simulated user call session during call-flow verification.
Figure 7B:
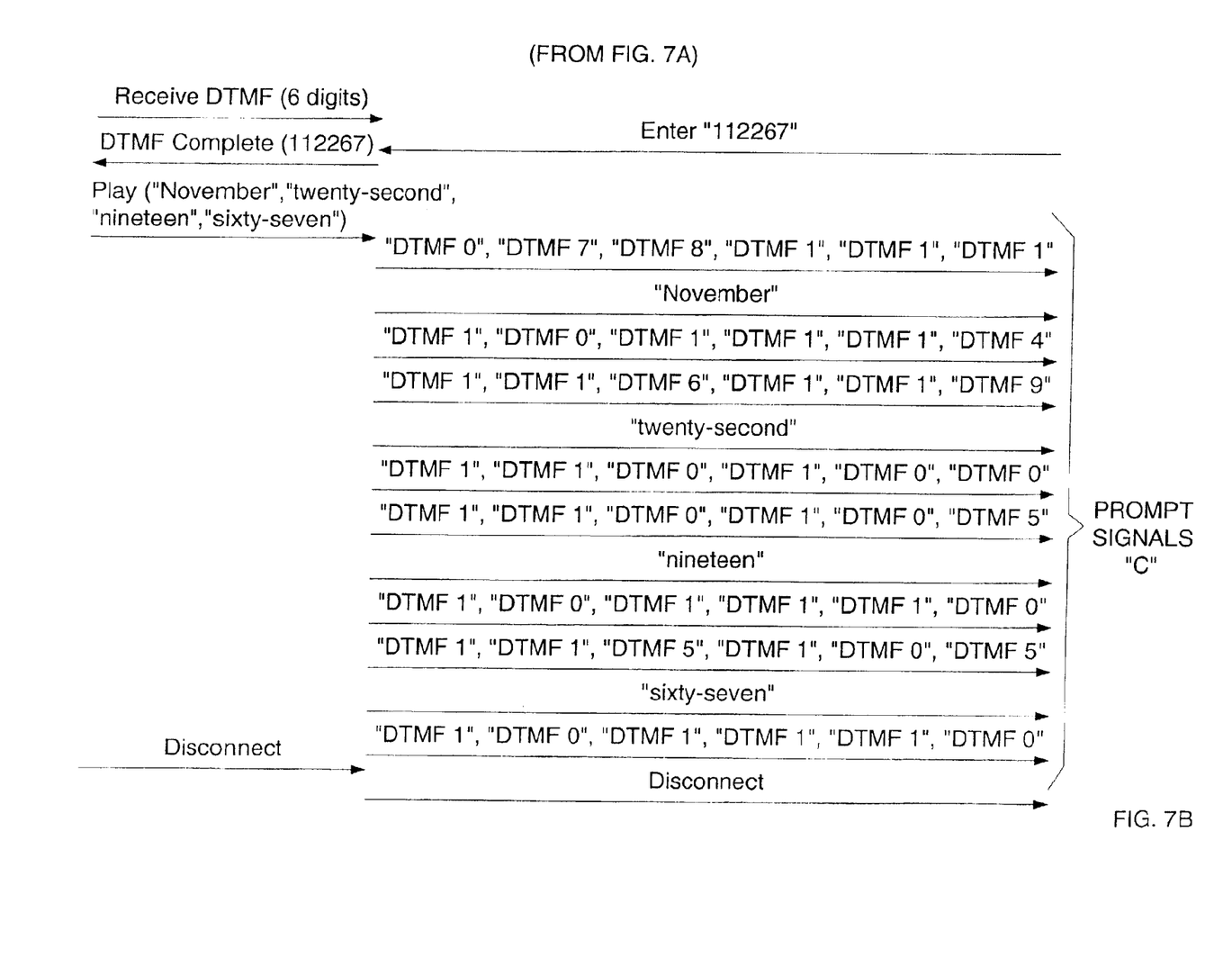

FIG. 7 provides a simplified example of transmissions between ACG unit 16 and IVR system 10 during the course of a simulated user call for call-flow verification purposes. To the left in FIG. 7 there is represented performance of an application program executed on IVR system 10 and programmed to provide utterances responsive to the user call. In operation of the application program the appropriate utterances are identified for retrieval, synthesis, etc., by utterance labels as discussed above. These utterance labels are thus available for use in encoding selected characters or all characters of a specific utterance label in coded form for inclusion in a prompt signal transmitted by VPS system 10.

As will be seen, starting at the top of FIG. 7 and proceeding item by item downward, ACG unit 16 first dials a call to IVR system 10 and then provides a CFV sequence code (in the form of DTMF signals) effective in this example (i) to activate the CFV mode of operation of IVR system 10, (ii) to indicate that the actual utterances are to be included in the prompt signals and (iii) to set the extent parameter to two characters. Accordingly, after the application identifies the utterances "Press one for date" and "Press two for money" IVR system 10 sends a prompt signal shown on successive lines of FIG. 7 as: DTMF signals representing "p" and "r"; the actual utterance "Press one for date"; DTMF signals representing "t" and "e"; DTMF signals representing "p" and "r"; the actual utterance "Press two for money"; and DTMF signals representing "e" and "y". This composite prompt signal including two utterances and 24 DTMF signals representing content of the utterance in coded form (identified in FIG. 7 as prompt signals "A") is received and stored by ACG unit 16.

Continuing in FIG. 7, after ACG unit 16 provides a simulated user response in the form of a touchtone signal for the number "1", IVR system 10 provides prompt signals "B" as illustrated, including one utterance "Enter date" and 12 DTMF signals representing the letters "e", "n" and "t", "e". This is repeated for prompt signals "C", which represents repetition back to the user of the user's entry of the touchtone keyed date "112267". Prompt signals "B" and "C" are stored by ACG unit 16.

As previously described, data representative of content of correct utterances which IVR system 10 is intended to provide in response to the simulated user inputs provided by ACG unit 16 has been stored. This may be accomplished, for example, by storing the ASCII representation of the utterance label or, alternatively, by storing the DTMF representation of such label. In either case, decode circuit 34 of ACG unit 16 is effective to identify the representation of the utterance label as included in received prompt signals. Comparison circuit 36 is responsive to the received representations of the utterance label for purposes of comparison with previously stored correct utterance label representation. Comparisons can be carried out in any suitable manner, for example, by comparing received DTMF signals to stored DTMF signals, or comparing received ASCII characters to stored ASCII characters. Comparisons may also be carried out in real time as prompt signals are received, or carried out subsequently based on storage of utterance label representations as received, with comparison performed later.

By comparing content of an utterance label as represented by coded signals included in a prompt signal with content of a correct utterance label (i.e., accurately responsive to a particular simulated user input) as represented by previously stored data, discrepancies can be identified. Such discrepancies may include an inaccurate utterance, a missing utterance, an out of order utterance, etc. Absent any discrepancy, accuracy of call-flow may be confirmed. In this manner, call-flow is verified for a single simulated user call. By providing ACG units 16, 17, 18 of suitable capacity, call-flow verification may be carried out by a simultaneous and continuing volume of calls of identical or differing content to provide verification under high volume or saturation conditions. Thus, any level of incoming user calls can be simulated. Call-flow verification can proceed on a call-by-call or other basis, without intrusion on routine calls as may be placed by users.

Figure 8:
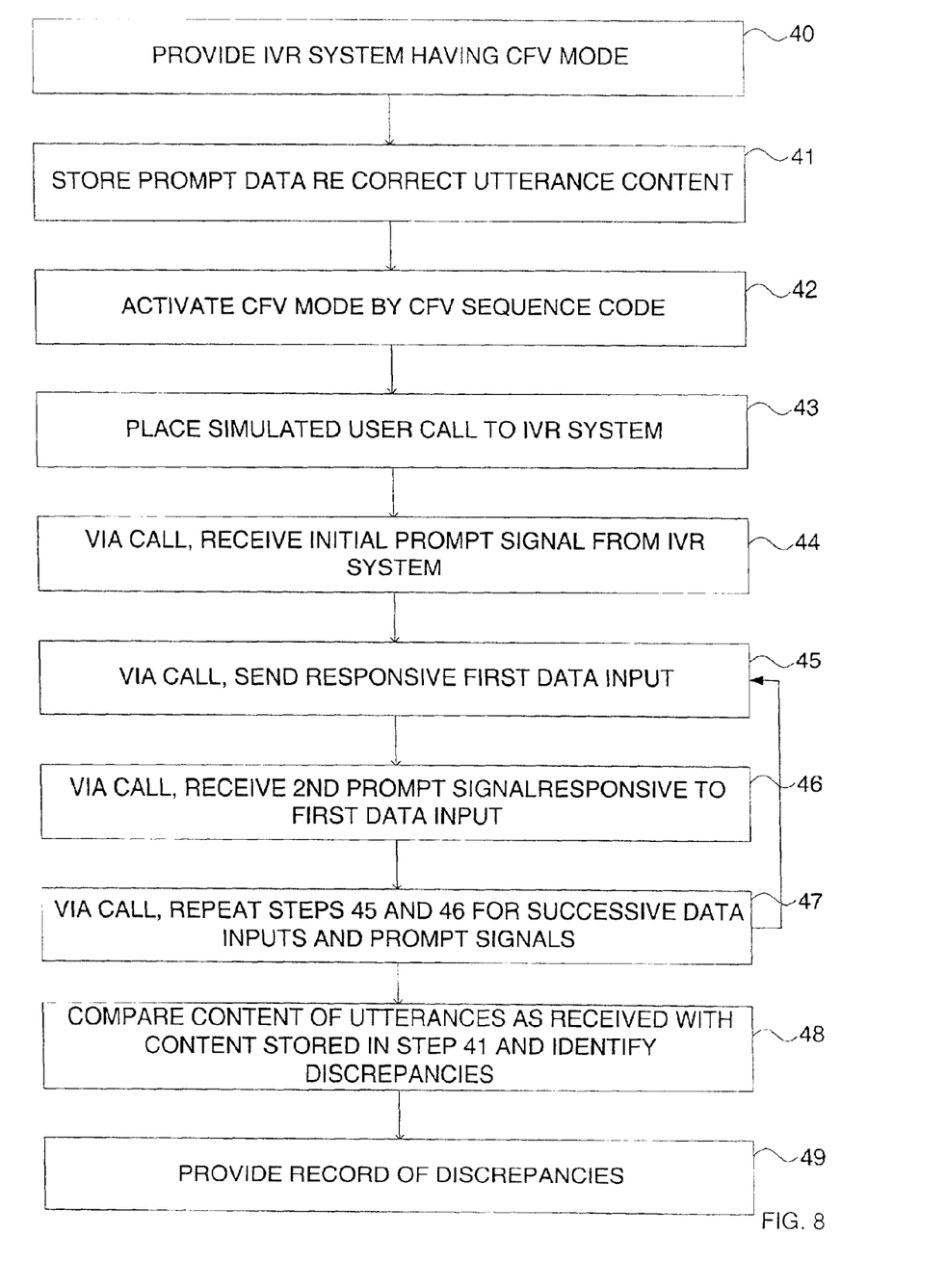
FIG. 8 is a flow chart useful in describing call-flow verification methods.

FIG. 8 is a flow chart illustrating an example of a call-flow verification method.

At 40, an IVR system (or more generally, an interactive audio system) adapted to operate in a CFV mode is provided. As described, encoding circuit 30 and activation circuit 32, which may be implemented via software, hardware, or a combination thereof, are provided within IVR system 10 for this purpose.

At 41, predetermined prompt data representative of content of correct utterances to be provided by the IVR system in response to specific data inputs in the course of a simulated user call is stored in ACG unit 16, so as to be available for purposes of comparison.

At 42, the CFV mode of the IVR system is activated by sending the appropriate CFV sequence code. This can be accomplished via a call placed to the IVR system, via a direct connection, via a switch on the IVR system, etc.

At 43, a simulated user call is placed to the IVR system (e.g., via suitable public or private network). Alternatively, this may be accomplished via continuation of a call placed for purposes of Step 42.

At 44, via the call connection established in Step 43, an initial (e.g., standard greeting/opening utterance) prompt signal is received from the IVR system.

At 45, via the same call connection, a first simulated user data input (e.g., one or more keypad key strokes) is sent to the IVR system in response to the initial prompt signal.

At 46, via the same call connection, a second prompt signal responsive to the first data input is received from the IVR system and data representative of utterance content is stored so as to be available for comparison purposes. Alternatively, comparisons may be carried out as data is received (e.g., on a real time basis).

At 47, via the same call connection, Steps 45 and 46 are repeated for successive simulated user data inputs and responsive prompt signals received from the IVR system, as appropriate and desired.

At 48, the content of each utterance label (as represented by coded signals included in respective prompt signals) is compared with content of a model utterance label (as represented by predetermined prompt data stored in Step 41) and discrepancies identified. The "content" of an utterance label for this purpose may, for example, be the first two and last two characters of the actual utterance label, all characters of the actual utterance label, or some other appropriate content, as previously described.

At 49, a record of discrepancies identified at Step 48 and/or lack thereof is provided in memory, as a printed report, as an accessible file, etc., for use in reviewing the results of the call-flow verification as performed.

Variations of the above will be apparent to skilled persons. For example, once preparatory steps (e.g., Steps 40 and 41) have been initially implemented for a particular IVR system, subsequent call-flow verification for that system can be carried out without the need to repeat such steps. Also, if the CFV mode has been previously activated and remains activated, further call-flow verification can be carried out without performance of Step 42.

Figure 9:
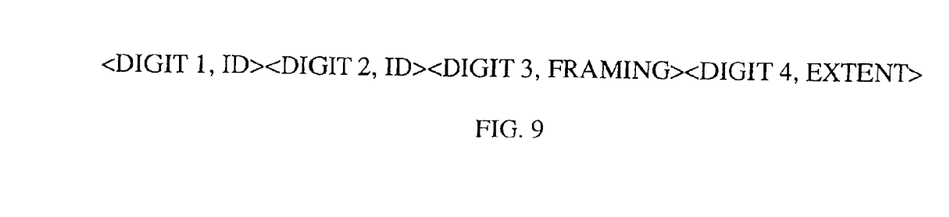
FIG. 9 illustrates a call-flow verification (CFV) sequence code for activating the CFV mode of an interactive audio system.

FIG. 9 is a representation of an example of a CFV sequence code for use, as described, to activate and deactivate the CFV mode on a per port (i.e., per line) basis in an interactive audio system, such as IVR system 10. The CFV sequence code may be transmitted in the form of a series of DTMF signals sent to IVR system 10 via a public telephone system or other means. In a currently preferred configuration a CFV sequence code includes at least four digits. As represented in the FIG. 9 example, digits 1 and 2 are identification (ID) digits used to indicate that the CFV mode is to be activated. Upon transmission of the CFV sequence code to IVR system 10 at a time when its CFV mode is already activated, ID digits 1 and 2 indicate that the CFV mode is to be deactivated. ID digits may have any suitable values, which are programmed into IVR system 10 and then transmitted by ACG unit 16 to activate/deactivate the CFV mode for call-flow verification purposes.

The third digit of the CFV sequence code of FIG. 9 is the "framing" digit. A code protocol may, for example, use the symbol "#" to indicate the actual utterance is to be included and framed on each side by DTMF signals representing its content, as previously described. Inclusion of any other letter or number at the digit 3 position would then indicate that the actual utterance is to be excluded, so that the prompt signals will include DTMF signals representative of utterance content, but not the utterances themselves.

The fourth digit of the CFV sequence code, as illustrated, is the "extent" digit. The code protocol may, for example, use the symbol "0" or zero to indicate that all characters of each utterance label are to be transmitted in DTMF format (see FIG. 6 and description thereof). Inclusion of any one of numbers 1 through 9 at the digit 4 position would then indicate that that is the number of characters of each utterance label which is to be transmitted in DTMF format (see FIGS. 4 and 5).

The presently preferred CFV sequence code thus includes two digits to signify that PVM mode is to be activated or deactivated and single digits to respectively signify the framing and extent of utterance content to be encoded. In FIG. 9 a particular sequence and number of these digits is illustrated. In application by skilled persons it will be apparent that different coding protocols may be employed depending on the protocols deployed in a telecommunications system. These protocols can then be used to relay information as to activation, framing and extent provided to the IVR system by network, direct connection, manipulation of switches at the IVR system itself, etc. For example, varying DTMF formats are present for telephony systems such as Autovon terminals. Government Autovon (Automatic Voice Network) telephones have 16 DTMF combinations, the extra four being used for "precedence", which is a designation assigned to a phone call by the caller to indicate to communications personnel the relative urgency (therefore the order of handling) of the call and to the called person the order in which the message is to be noted. Similarly, DTMF to dial pulse code can be utilized in a PBX system, through DTMF to dial pulse conversion in which the PBX converts DTMF to accomodate dialing to rotary dialing.

With an understanding of the invention, it will be apparent that further benefits can be provided in verifying operation of IVR systems, as well as other types of interactive audio systems. For example, detection of "talk off", occurring when an IVR system is subject to false user data inputs (i.e., as a result of the presence of signals appearing to be DTMF signals included within spoken prompts) during a call, can be determined using discrepancy analysis of stored call-flow verification results.

While there have been described the currently preferred embodiments of the invention, those skilled in the art will recognize that other modifications may be made without departing from the invention and it is intended to claim all modifications and variations as fall within the scope of the invention.

What is claimed is:

1. A call-flow verification method, for use with an interactive audio system having a call-flow verification (CFV) mode in which content of utterances responsive to an incoming call is represented by coded signals included in prompt signals, comprising:
   (a) storing predetermined prompt data representative of content of correct utterances to be provided by the interactive audio system in response to specific data inputs;
   (b) sending a first data input responsive to a first prompt signal received from the interactive audio system;
   (c) receiving a second prompt signal responsive to said first data input and including coded signals representing content of an utterance label; and
   (d) comparing content of said utterance label, as represented by such coded signals included in the second prompt signal, against content of an expected utterance label, as represented by the predetermined prompt data, to provide call-flow verification and identify call-flow discrepancies.

2. A call-flow verification method as in claim 1, for use with an interactive audio system having a selectable CFV mode activatable by a CFV sequence code, additionally comprising preceding step (b):
   (x) via a call connection to the interactive audio system, activating the CFV mode by sending the CFV sequence code.

3. A call-flow verification method as in claim 1, additionally comprising:
   e) providing a record of discrepancies identified by comparing content in step (d), said discrepancies comprising one or more of an inaccurate utterance, a missing utterance and an out of order utterance.

4. A call-flow verification method as in claim 1, additionally comprising:
   e) sending a second data input responsive to the second prompt signal received from the interactive audio system;
   f) receiving a third prompt signal responsive to said second data signal; and
   g) comparing content of an utterance label represented by coded signals included in said third prompt signal against the predetermined prompt data.

5. A call-flow verification method as in claim 1, wherein said coded signals comprise DTMF signals representing utterance label characters in ASCII format.

6. A call-flow verification method as in claim 1, wherein the interactive audio system is adapted to enable activation of the CFV mode by transmission of a CFV mode activation command remotely to the interactive audio system.

7. A call-flow verification method as in claim 1, wherein the interactive audio system is adapted to enable activation of the CFV mode on one of: a per call basis; or a basis covering a plurality of calls received while the CFV mode is activated.

8. A call-flow verification method as in claim 1, wherein the interactive audio system is responsive to a CFV sequence code to activate the CFV mode when said mode is currently deactivated.

9. A call-flow verification method as in claim 1, wherein the interactive audio system is an interactive voice response telephone system.

10. A call-flow verification method as in claim 1, wherein steps (b), (c), and (d) are implemented by an automated call generator having access to said predetermined prompt data, to script data for calls placed to the interactive audio system, and to stored received prompt signals.

11. A call-flow verification method, for use with an interactive audio system having a call-flow verification (CFV) mode in which content of utterances responsive to an incoming call is represented by coded signals included in prompt signals, comprising:
    (a) via a call to the interactive audio system, sending a first data input responsive to a first prompt signal received from the interactive audio system;
    (b) via said call, receiving from the interactive audio system a second prompt signal responsive to said first data input; and
    (c) comparing content of an utterance label as represented by coded signals included in said second prompt signal with predetermined content of a correct utterance label and identifying call-flow discrepancies to provide call-flow verification.

12. A call-flow verification method as in claim 11, for use with an interactive audio system having a selectable CFV mode activatable by CFV sequence code, additionally comprising preceding step (a):
    (x) via a call to the interactive audio system, activating the CFV mode by sending the CFV sequence code.

13. A call-flow verification method as in claim 11, wherein said coded signals comprise DTMF tones representing utterance label characters in ASCII format.

14. A call-flow verification method comprising:
    (a) providing an interactive voice response (IVR) system having a selectable call-flow verification (CFV) mode in which content of utterances responsive to an incoming call is represented by coded signals included in prompt signals, the CFV mode selectable by a CFV sequence code;
    (b) storing predetermined prompt data representative of content of correct utterances to be provided by the IVR system in response to specific data inputs during incoming calls;
    (c) activating the CFV mode by sending the CFV sequence code;
    (d) sending a first data input responsive to a first prompt signal received from the IVR system;
    (e) receiving from the IVR system a second prompt signal responsive to said first data input; and
    (f) comparing content of an utterance label, as represented by coded signals included in said second prompt signal, against content of a correct utterance label as represented by predetermined prompt data, to provide call-flow verification and identify call-flow discrepancies.

15. A call-flow verification method as in claim 14, wherein said coded signals comprise DTMF tones representing utterance label characters in ASCII format.

16. A call-flow verification method as in claim 14, additionally comprising:
    g) providing a record of discrepancies identified in step (F) said discrepancies comprising one or more of an inaccurate utterance, a missing utterance and an out of order utterance.

17. A call-flow verification (CFV) sequence code, for use with an interactive audio system providing audio signals including utterances, to activate a call-flow verification (CFV) mode, comprising:

at least one identification digit indicating the CFV mode is to be activated;

at least one frame digit indicating whether to include or exclude the utterance when providing an audio signal which includes DTMF signals representing the content of such utterance; and at least one extent digit identifying the number of characters of an utterance which are to be represented by the DTMF signals representing content of that utterance.

18. A CFV sequence code as in claim 17, wherein said at least one extent digit identifies one of: a specific number of alphanumeric characters; and all of such characters of said utterance.

19. A CFV sequence code as in claim 17, wherein said at least one identification digit indicates both activation of an inactive CFV mode and deactivation of a previously activated CFV mode.

20. A CFV sequence code as in claim 17, wherein said code includes two identification digits to control activation of the CFV mode.

21. Call-flow verification apparatus, for use in an interactive audio system arranged to provide prompt signals including utterances to guide data entry by a user, comprising:

an encoding circuit to provide coded signals representative of content of utterances in coded format for inclusion in prompt signals; and an activation circuit to enable activation of the encoding circuit so that prompt signals provided by the system include such coded signals in a form usable for call-flow verification purposes.

22. Call-flow verification apparatus as in claim 21, wherein the activation circuit permits selection of prompt signals comprising one of: a combination of an utterance and coded signals representative of content thereof; and coded signals representative of an utterance, without inclusion of such utterance.

23. Call-flow verification apparatus as in claim 21, wherein the activation circuit enables activation of the encoder to cause the coded signals included in a prompt signal to represent all characters of an utterance label represented by such coded signals.

24. Call-flow verification apparatus as in claim 21, wherein the encoding circuit provides coded signals comprising DTMF signals representing utterance characters in ASCII format.

* * * * *